United States Patent Office 3,264,379
Patented August 2, 1966

3,264,379
METHOD OF ROUNDING ACTINIDE OXIDE GEL PARTICLES
Robert L. Hamner, Oak Ridge, and William H. Smith, Jr., Knoxville, Tenn., assignors to the United States of America as represented by the United States Atomic Energy Commission
No Drawing. Filed Aug. 27, 1963, Ser. No. 305,008
8 Claims. (Cl. 264—.5)

Our invention relates to fuel and fertile materials for nuclear reactors and more particularly to a method of rounding actinide oxide gel particles.

Oxides of the actinide elements, thorium, uranium and plutonium are useful as fuel and fertile materials for nuclear reactors. These oxides may be employed in the form of sintered compacts or as a dispersion in a matrix of a suitable metal or ceramic material. For example, one type of fuel element comprises thorium oxide or thorium oxide-10 percent uranium oxide incorporated as a dispersion in a beryllium oxide matrix.

For applications of this type spherical fuel particles present several advantages over irregular shapes. Their low surface-to-volume ratio minimizes fission-produced damage to the matrix during irradiation. Stringering of the fuel element during fabrication is decreased, and stresses are more equally distributed. Another requirement for the dispersed oxides in this type fuel element is a homogeneous structure with equal distribution of fissionable material where a mixed oxide such as thorium oxide-10 percent uranium oxide is employed. A uniform particle size within the range of about 50 to 500 microns, depending on the design of the particular fuel element, is an additional requirement.

Thorium oxide and mixed thorium-uranium and thorium-plutonium oxides with favorable properties for certain types of fuel elements have been prepared by forming an oxide sol containing a critical proportion of nitrate ion, evaporating the sol under controlled conditions to produce dried gel fragments and calcining the gel fragments. The product oxide particles exhibit a uniform distribution of fissionable oxide throughout the thorium oxide, a high density and a structure suitable for fabrication by vibratory compaction. These particles, however, are not suitable for dispersion fuel elements because of their irregular shape, which is characterized by the presence of numerous angular projections. Conventional rounding techniques such as dry grinding and tumbling have proven ineffective because the particles are brittle and tend to chip rather than wear away smoothly by attrition. It is desired to provide a method of rounding these particles to spherical or near-spherical form for use in dispersion fuel elements. Another property desired in dispersed fuel particles is controlled sinterability, with a resulting shrinkage during firing compatible with the shrinkage of the matrix material. Where the sinterabilities of the two materials differ substantially, the matrix, particularly in the case of beryllium oxide, may develop cracks or voids during firing.

It is, therefore, an object of our invention to provide a method of preparing spherical actinide oxide gel particles.

Another object is to provide a method of rounding thorium oxide particles prepared from a sol-derived thorium oxide gel.

Another object is to provide a method of preparing spherical thorium oxide particles 50 to 500 microns in diameter and containing a minor proportion of a fissionable oxide distributed therein.

Another object is to provide a method of imparting into said particles shrinkage properties equivalent to those of beryllium oxide.

Other objects and advantages of our invention will be apparent from the following detailed description and claims appended hereto.

In accordance with our invention irregularly shaped, dried actinide oxide gel particles are rounded by wetting the surface of the particles with a solution comprising substantially equivalent proportions of water and a water-miscible, inert organic liquid and tumbling the wetted particles. The particles are then densified by firing at an elevated temperature.

We have found that a combined aqueous-organic wetting agent provides an effective means for removal of irregular projections from oxide gel particles. Although our invention is not to be understood as limited to a particular theory, it is postulated that the projections are rendered amenable to mechanical attrition by partial dissolution in the water and that the organic liquid serves primarily as a diluent and prevents excessive dissolution. Controlled quantities of both water and organic liquid are critical to this process, as described below.

The method of our invention is broadly applicable to rounding dried oxide gel particles which are slightly soluble in water. In particular, this method is useful for rounding actinide oxide gel particles prepared by the process commonly referred to as the "sol-gel" process. In this process thorium oxide gel particles are prepared by forming a thorium oxide sol containing nitrate ion at a nitrate-to-thorium molar ratio of about .05 to .15 and evaporating the sol at a temperature of 50° C. to 100° C. until all but about 3 to 7 weight percent of the residual nitrate and water are removed. The resulting gel fragments are then fired at a temperature of 1100° C. to 1200° C. to produce high-density oxide particles. This process is also employed for mixed thorium-uranium and thorium-plutonium oxides by providing up to 10 mole percent uranium values or up to 5 mole percent plutonium values in the sol.

A critical feature in preparing oxide gel particles for rounding by the method of our invention is the avoidance of temperatures over about 300° C. in drying the particles. At higher temperatures the particles are rendered insoluble, and the wetting solution is ineffective. Accordingly, in rounding particles prepared by the "sol-gel" process, it is essential that rounding be effected prior to the high-temperature firing step. The conditions normally employed in the drying step in the "sol-gel" process, that is, drying at a temperature of 80 to 100° C. until all but about 3 to 7 weight percent nitrate and water are removed (24 to 48 hours under typical conditions) may likewise be employed for preparing gel particles for the present method. The product of this drying step is in the form of fragments, mostly over one millimeter in size, formed by cracking of the gel. These fragments break up easily, and any desired size fraction, e.g., −24, +100 mesh, U.S. Sieve Series (149 to 710 microns) for product particles with a diameter of 100 to 500 microns, may be readily obtained by conventional comminution and screening. Because of the removal of angular projections, the particle size as determined by screening is decreased during rounding; the size fraction employed as starting material for the rounding step is accordingly larger than the desired product size. The abraded material and fines produced in this process may be recycled to the liquid gel stage of the "sol-gel" process described above.

The wetting solution for the method of our invention consists of water and an inert organic liquid, preferably at approximately equal volume proportions. The solution composition may be varied to within the range of 25 to 75 volume percent of either component, and the balance the other component. At proportions of water over 75 percent, tumbling is ineffective and a sticky mass is formed. Less than 25 percent water in the solution results in an impractically slow rate of dissolution and removal of projections.

Any organic liquid which is miscible with water and which is inert to the gel particles may be employed as the organic component of the wetting solution. Examples of suitable liquids are water-miscible alcohols and ketones such as acetone. Ethyl alcohol is preferred because of its low cost and convenience of use.

The wetting solution is mixed with the dried gel particles at a proportion just sufficient to wet the particle surfaces. The amount required depends on the size and surface area of the particles. For particles in the range of −60, +100 mesh U.S. Sieve Series (149 to 250 microns), 50 to 100 cubic centimeters of wetting solution per kilogram of particles may be employed, and slightly smaller amounts are employed for larger particles. Excessive amounts of wetting solution cause excessive dissolution and attrition and result in wafer-shaped, rather than spherical, product particles.

The wetted particles are tumbled until a substantially spherical shape is obtained. Tumbling is effected by placing the particles in a rotatable container such as a horizontally disposed cylinder and rotating the container at a speed such that the particles continuously fall over one another. Rounding of the particles is completed in a tumbling period of about 4 to 24 hours under typical conditions.

The resulting spherical particles are then converted to a form suitable for incorporation in fuel element dispersions by firing at an elevated temperature. Where maximum densification is desired a firing temperature over 1100° C., and preferably about 1150° C. may be employed. For use in a beryllium oxide matrix, however, it is preferred to fire the particles at a temperature such that the sinterability and remaining shrinkage correspond to the shrinkage of the beryllium oxide. A particle firing temperature of about 500° C. to 600° C. is suitable for this purpose.

Our invention is not to be understood as limited to a particular method of fuel-element fabrication, and conventional techniques which provide for uniform dispersion of the particles may be employed. In a preferred procedure for beryllium-oxide-matrix fuel elements, the particles, after being fired at 500° C. to 600° C., are moistened with an organic liquid such as alcohol, and the wetted particles are allowed to stand in air until the particle surface first appears dry. The particles are then combined with beryllium oxide powder at the proportion desired and the mixture is tumbled. The beryllium oxide is uniformly coated on the surface of the particles by this means, apparently because of surface adhesion produced by remaining traces of the organic liquid. The coated particles may then be pressed and fired to produce a beryllium-oxide-matrix fuel element of the desired configuration. Preferred firing conditions are a temperature 1700° to 1800° C. and a hydrogen atmosphere. For this embodiment beryllium oxide powder having a particle size less than about 2 microns is required. The coating thickness may be varied by adjusting the amount of beryllium oxide in the tumbling step.

It is to be understood that the method of our invention is not limited to actinide oxide particles. Any irregularly shaped oxide particles which have passed through a gel stage in preparation and which are slightly soluble in water may be rounded by this method.

Our invention is further illustrated by the following specific examples.

Example I

Thorium oxide gel fragments containing 5 weight percent uranium oxide were prepared by evaporating a uranium-containing thorium oxide sol and drying the resulting gel at a temperature of 80° C. to 90° C. A 200-gram portion of the gel fragments, having a highly angular shape and a particle size of −40, +60 mesh (U.S. Sieve Series), was placed in a cylindrical glass container together with 15 cubic centimeters of a solution consisting of water and ethyl alcohol at a volume ratio of 1:1. The moistened particles were tumbled at a rate of 100 revolutions per minute for a period of 16 hours. The particles were then removed and inspected visually. All of the angular projections had been removed, and the particles exhibited a smooth surface.

Example II

A 20-gram sample of the particles rounded in Example I and having a particle size of −60, +100 mesh (U.S. Sieve Series) was fired at a temperature of 500° C. The fired particles were wetted with ethyl alcohol and allowed to stand until their surfaces first appeared dry. The particles were then tumbled in a cylindrical container while 11.75 grams of beryllium oxide powder (UOX grade) was slowly added. The powder was coated on the surface of the particles by this means. The coated particles were compressed into pellets .4 inch in diameter and .5 inch long at a pressure of about 20,000 pounds per square inch, the green density of the resulting pellets being 2.6 grams per cubic centimeter. The pellets were fired at a temperature of 1750° C. in a hydrogen atmosphere. A sample of the fired pellets was sectioned and examined metallographically. The fuel particles maintained their integrity and were uniformly distributed. The matrix was continuous and contained no cracks. Slight voids were present adjacent some of the fuel particles, indicating that a silghtly higher prefiring temperature should be used.

The above examples are merely illustrative and are not to be understood as limiting the scope of our invention, which is limited only as indicated by the appended claims.

Having thus described our invention, we claim:

1. The method of rounding irregularly shaped, slightly water-soluble oxide gel particles which comprises wetting the surface of said particles with a solution comprising 25 to 75 volume percent water and the balance a water-miscible inert organic liquid and tumbling the resulting wetted particles whereby irregular projections on said particles are removed.

2. The method of rounding irregularly shaped actinide oxide particles prepared by drying an actinide oxide gel at a temperature not exceeding about 300° C. which comprises wetting the surface of said particles with a solution comprising 25 to 75 volume percent water and the balance a water-miscible inert organic liquid and tumbling the resulting wetted particles until the surfaces thereof are substantially spherical.

3. The method of rounding thorium oxide particles prepared by drying a nitrate-containing thorium oxide gel at a temperature not exceeding 300° C. which comprises wetting the surface of said particles with a solution comprising 25 to 75 percent water and the balance a water-miscible inert organic liquid and tumbling the resulting wetted particles until the surfaces thereof are substantially spherical.

4. The method of claim 3 wherein a fissionable oxide selected from the group consisting of uranium oxide at a proportion up to about 10 mole percent and plutonium oxide at a proportion up to about 5 mole percent is provided in said gel.

5. The method of claim 4 wherein the particle size of the dried gel particles is about 150 to 700 microns.

6. The method of claim 4 wherein the proportion of water in said solution is about 50 volume percent.

7. The method of claim 4 wherein said starting thorium oxide particles contain about 3 to 7 weight percent volatile nitrate and water.

8. The method of claim 4 wherein said organic liquid is selected from the group consisting of water-miscible alcohols and ketones.

References Cited by the Examiner
UNITED STATES PATENTS

| | | | |
|---|---|---|---|
| 3,146,281 | 8/1964 | Krystyniak et al. | 264—.5 |
| 3,227,783 | 1/1966 | Williams | 264—.5 |

FOREIGN PATENTS 904,679  9/1959  Great Britain.

L. DEWAYNE RUTLEDGE, *Primary Examiner.*